US006923215B2

(12) United States Patent
Weber

(10) Patent No.: US 6,923,215 B2
(45) Date of Patent: Aug. 2, 2005

(54) PISTON-TYPE ACCUMULATOR

(75) Inventor: Norbert Weber, Sulzbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/486,343

(22) PCT Filed: Jul. 18, 2002

(86) PCT No.: PCT/EP02/07982

§ 371 (c)(1),
(2), (4) Date: Feb. 10, 2004

(87) PCT Pub. No.: WO03/016723

PCT Pub. Date: Feb. 27, 2003

(65) Prior Publication Data

US 2004/0238054 A1 Dec. 2, 2004

(30) Foreign Application Priority Data

Aug. 16, 2001 (DE) ........................................ 101 39 192

(51) Int. Cl.[7] ................................................ F16L 55/04
(52) U.S. Cl. ........................................................ 138/31
(58) Field of Search .................................... 138/30, 31

(56) References Cited

U.S. PATENT DOCUMENTS 2,683,467 A 7/1954 Greer
2,817,361 A 12/1957 Mercier
2,873,763 A * 2/1959 Mercier ....................... 138/31
3,074,437 A * 1/1963 Mercier ....................... 138/31
3,863,677 A * 2/1975 Tarsha ........................ 138/31
4,187,682 A * 2/1980 Shen .......................... 60/413
4,538,972 A * 9/1985 Gooden ...................... 417/540
4,651,782 A 3/1987 Fulmer
4,674,541 A * 6/1987 Fulmer ........................ 138/31
4,678,010 A 7/1987 Purvis et al.
4,685,491 A * 8/1987 Fulmer et al. ................ 138/31
4,693,276 A * 9/1987 Fulmer ........................ 138/31
5,031,664 A * 7/1991 Alaze .......................... 138/31
6,065,814 A * 5/2000 Nishii et al. ............ 303/116.1
2003/0075225 A1 * 4/2003 Dinkel et al. ................ 138/31

FOREIGN PATENT DOCUMENTS

JP 09072310 A 3/1997
JP 2000186701 A 7/2000

* cited by examiner

*Primary Examiner*—James Hook
(74) *Attorney, Agent, or Firm*—Roylance, Abrams, Berdo & Goodman, L.L.P.

(57) ABSTRACT

A piston-type accumulator includes a separating piston (13) displaced axially within a piston housing (1). The piston separates a fluid side (15) of the accumulator from its gas side (23), and has comprises two sealing areas (17, 25) offset relative to each other in the axial direction. The sealing areas are arranged on the circumference of the piston and are displaced along the inner wall surface of the accumulator housing. The accumulator housing (1) is provided with a ventilation device (31) between the sealing areas (17, 25) for discharging leakage passing through the sealing areas (17, 25).

8 Claims, 1 Drawing Sheet

PISTON-TYPE ACCUMULATOR

FIELD OF THE INVENTION

The present invention relates to a piston-type accumulator comprising a separating piston axially displaceable inside a piston housing. This piston separates a fluid side of the accumulator sealing areas axially offset from each other on its circumference piston housing.

BACKGROUND OF THE INVENTION

Piston-type accumulators are provided with a large number of designs. The part of the piston housing, surrounding the separating piston and extending axially, is in the form of a cylindrical tube. For this reason, the piston-type accumulator is often also termed a cylindrical accumulator. The sealing areas on the circumference of the separating piston customarily are formed of annular or O-ring seals which are seated in external circumferential grooves axially offset from each other in the separating piston.

Very high requirements are set, such as that of operation over wide temperature ranges, for example, between −40° C. and 150° C., from the viewpoint of the operating capacity of such cylindrical or piston-type accumulators. Test stand experiments show that accumulators do not function satisfactorily with respect to long-term behavior, since gas often overflows toward the oil or fluid side. Such behavior is not acceptable in the case of accumulators which are to perform a safety function, especially if the accumulators involved are used in conjunction with hydraulic braking systems. Overflow of gas into the hydraulic braking system could result in malfunction or even failure.

SUMMARY OF THE INVENTION

Objects of the present invention are to provide a piston-type accumulator which retains its sealing capacity even under extreme conditions and over long periods of operation and which ensures that gas cannot reach the fluid side under any operating conditions.

According to the present invention, these objects are attained by a piston-type accumulator in which the piston housing has, at a point situated between the sealing areas of the separating piston, an overflow feature for discharging leakage media overflowing the sealing areas.

The overflow feature, positioned between the sealing areas on the gas side and the fluid side, ensures that media cannot overflow from the gas side to the fluid side or in the opposite direction, even if molecules of the media adjacent to the separating piston make their way through the otherwise tight sealing system on the circumference of the separating piston. Because of the small molecules of the medium situated on the gas side, nitrogen in most cases, some penetration of the sealing rings provided on the separating piston cannot be completely eliminated, even if the surface on the inside of the cylindrical tube of the piston housing has been subjected to the most precise machining. Because of the requirement, by definition, of very little friction between the piston seal and the inside of the cylindrical tube during piston movement, high surface pressure cannot be provided thereat to avoid leakage. Even in the event of passage of leaks of hydraulic fluid, for example, through the piston seal from the fluid side, the hydraulic fluid leakage cannot penetrate the gas side because of the overflow feature.

The piston-type accumulator of the present invention is suitable, in particular, for applications in which safety requirements must be met, particularly for braking systems. Prevention of the passage of gas molecules to the fluid side is of decisive importance in this situation.

A vent opening drilled through the wall of the piston housing may be provided as an overflow feature.

In one advantageous embodiment, the discharge end of the vent opening communicates with a collecting chamber receiving the leakage media. As a result, leakage media are discharged to the exterior only after the collecting chamber is filled. The discharge of the collecting chamber can have a normally closed valve. This valve can be opened by the pressure prevailing in the collecting chamber. Automatic discharge occurs when a predetermined pressure builds up, after the collecting chamber has been completely filled.

In the case of an embodiment as a "supertight" piston-type accumulator, an additional third sealing area positioned even closer to the gas side may be provided, in addition to the sealing areas between which the overflow feature is positioned. Since passage of leakage components from the fluid side is possible, the piston seal forming the third sealing area and normally the piston seal forming the second sealing area as well would run dry. In one advantageous exemplary embodiment of the present invention, a supply device is provided in the separating piston for delivery of a free-flowing lubricant to the circumferential section of the separating piston positioned between the second and third sealing areas of the separating piston. Such lubricant may be a high-viscosity oil, such as a mineral oil or a free-flowing lipid. In addition to the lubrication achieved by this configuration, as a result of which piston friction is reduced and the service life extended, an additional blocking or sealing effect is obtained because of the high viscosity of the substance delivered.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawing which form a part of this disclosure.

DETAILED DESCRIPTION OF THE INVENTION

Figure 1:
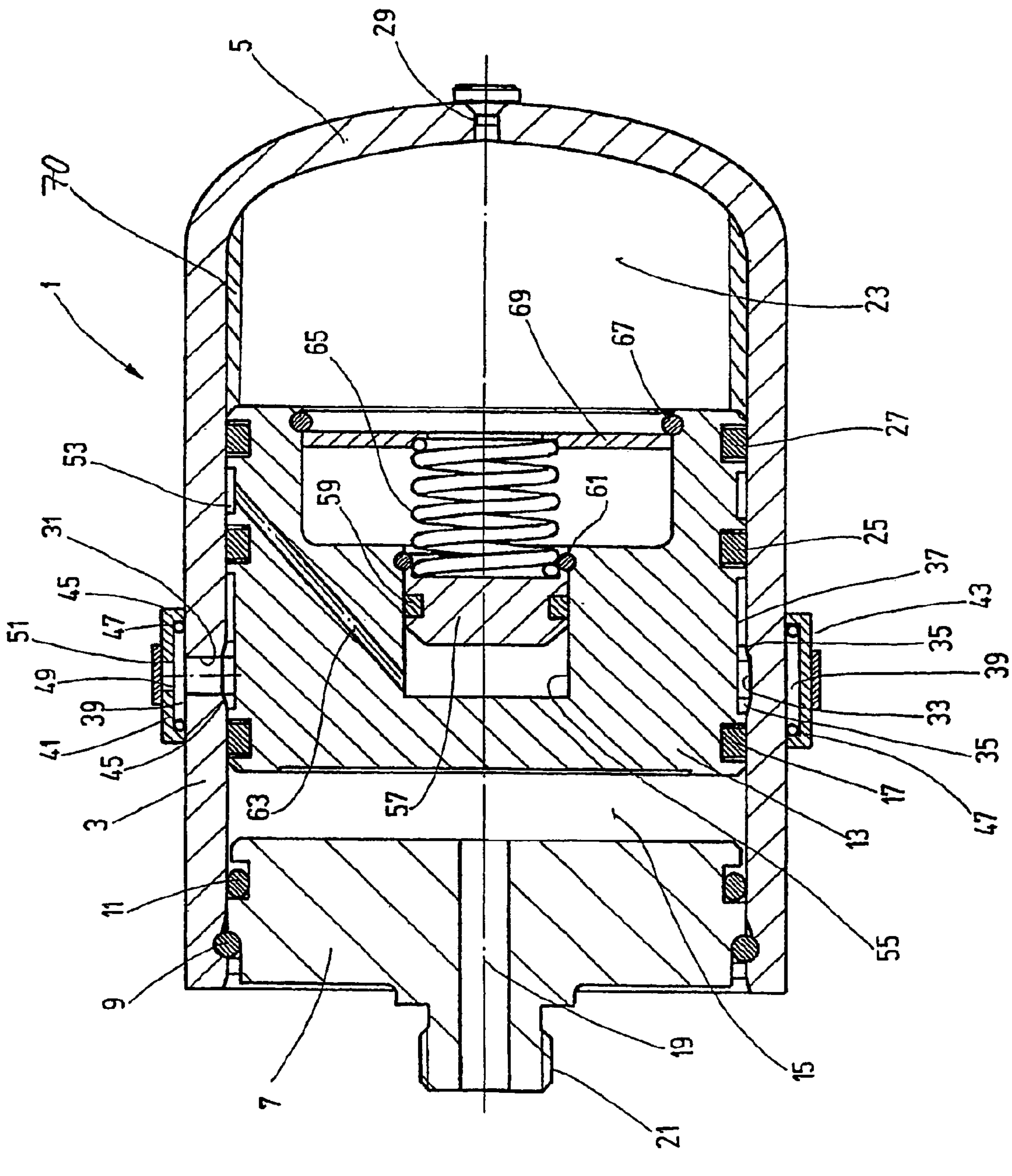
FIG. 1 is a side elevational view in section of a piston-type accumulator according to an embodiment of the present invention.

The piston-type accumulator shown in the drawing has a piston housing 1 with a cylindrical tube 3 closed on one end by an end wall 5 integral with the cylindrical tube 3 and on the opposite end by a sealing cover 7. In the example illustrated, the sealing cover 7 is fastened to the cylindrical tube 3 by a snap ring 9, and is sealed on the inner wall of the cylindrical tube 3 by an O-ring 11. Snap ring 9 could be replaced by welding of the sealing cover to the cylindrical tube 3.

A separating piston 13 is mounted in the cylindrical tube 3 for axially displacement. Separating piston 13 is sealed off from the superfinished inner wall of the cylindrical tube 3 by three piston seals axially offset from each and forming a first, second, and third sealing areas on the circumference or lateral peripheral side of the separating piston 13. The piston seals are each represented by sealing rings seated in circumferential grooves in the separating piston 13. First sealing ring 17, nearest the fluid side 15 of the piston-type accumulator, forms the first sealing area. A passage 19 with a connecting sleeve 21 effects connection to an associated hydraulic system (not shown).

A second sealing ring 25 is seated in a circumferential groove in the separating piston 13, and is provided as the second sealing area, axially offset from the sealing ring 17 forming the first sealing area, in the direction of the gas side 23 adjacent to the other side of the piston. A third sealing area is axially offset even further in the direction of the gas side 23, is formed by a third sealing ring 27, and is seated in a circumferential groove in separating piston 13.

The path of the stroke of the separating piston 13 inside the cylindrical tube 3 is limited to a desired operating stroke length by mechanical stops (not shown) in the cylindrical tube, or, as an alternative, by controlling the pressure relationships of fluid side 15 and gas side 23. The gas charging pressure of gas side 23 may be adjusted by a charging connection 29. In the area of the cylindrical tube 3, which extends over the entire operating stroke length of the separating piston 13 between the first and the second sealing area, that is, between sealing ring 17 and sealing ring 25, a vent opening 31 extends through the wall of the cylindrical tube 3. Vent opening 31 is formed as an overflow feature permitting discharge of leakage media. A recess in the shape of an annular groove 33 with beveled side edges extends over the entire circumference of the inner wall, and is in the inner wall surface of the cylindrical tube 3 in the area of the interior outlet or inner end of the vent opening 31. The recess 33 also prevents shearing off of the seals 25 and 27 during assembly when these seals are pushed over the opening 31. Together with a recess 37 in the circumference or lateral peripheral side of the separating piston, an inner chamber communicating with the vent opening 31 is formed into which leakage media may enter should migration of fluid molecules through the sealing ring 17 occur or should the sealing rings 27 and 25 be penetrated by the small gas molecules of the charging gas on the gas side 23. Any such leakage media pass through the vent opening 31 into a collecting chamber 39 with which the outer end of the vent opening 31 communicates.

In the exemplary embodiment illustrated, collecting chamber 39 is formed by an annular element 41 seated on the outside of the cylindrical tube 3. This annular element is a shaped element of plastic or sheet metal integrated with a flat outer annular surface or member 43 and set laterally in edge strips 45 extending vertically relative to it. The free ends of edge strips 45 rest on the exterior of the cylindrical tube 3 so that the annular surface or member 43 is kept equidistant from the exterior of the cylindrical tube 3. The edge strips 45 are sealed off from the exterior of the cylindrical tube 3 by O-rings 47. The collecting chamber 39 formed has an outlet to the exterior formed by an opening 49 which is opened or closed by a valve system. An elastic band 51 surrounds the annular surface or member 43 of the annular element 41. The initial tension selected, which the band 51 applies to the annular surface or member 43, is such that the band 51 is lifted from the opening 49 when a predetermined excess pressure is present in the collecting chamber 39 to discharge the leakage media present in the collecting chamber 39 into the environment.

In FIG. 1, the opening 49 forming the outlet is shown on the top side of the cylindrical tube 3. For the overflow feature to extend upward no matter how the piston-type accumulator is mounted, the annular element 41 is rotatable on the cylindrical tube 3 to permit the opening 49 to be adjustable to the highest position.

In place of sealing the collecting chamber 39 off from the cylindrical tube 3 by the O-rings 47, the ends of the edge strips 45 could be configured as sealing edges acting directly in conjunction with the cylindrical tube 3. In place of a clear through vent opening 31, an opening containing a porous plug-like insert might be provided, for example, by use of a plug of a porous sintered material.

An annular groove 53 communicates with a supply device for supplying a free-flowing lubricant, and is in the circumferential area of the separating piston 13 between the second and third sealing areas, that is, between sealing rings 25 and 27. The separating piston 13 has, for this purpose, a concentric auxiliary cylinder 55 mounted in its interior, closed in the direction of the fluid side 15, and open in the direction of the gas side 23. An auxiliary piston 57 is introduced from the direction of the gas side into the auxiliary cylinder 55. This auxiliary piston 57 has a circumferential piston seal 59 and is secured against escape from the auxiliary cylinder 55 by a snap ring 61. The enclosed space situated between the auxiliary piston 57 and the closed end of the auxiliary cylinder 55 is filled with a supply of a free-flowing lubricant. A connecting channel 63 connects this lubricant supply space to the annular groove 53 on the circumference of the separating piston 13.

The auxiliary piston 57 is spring loaded or biased by a helical pressure spring 65. Spring 65 rests on a retaining plate 69 secured on the separating piston 13 by a snap ring 67. Consequently, the auxiliary piston 57 is subject to the pressure of the gas side 23 and to the initial tension of the spring, so that the auxiliary piston 57 in the compartment containing the supply of lubricant generates a delivery pressure by which the lubricant is pressed into the annular groove 53. The lubricant is a high-viscosity oil or a free-flowing lipid. As a result, a blocking or sealing effect is produced in the relevant areas of the separating piston 13, in addition to lubrication of the sealing rings 25, 27. Especially good long-term behavior of the piston-type accumulator is obtained, in particular complete safety from escape of the medium on the gas side 23 to the fluid side 15, so that the piston-type accumulator of the present invention is especially well suited also for use in braking systems.

The elastic band 51 covering the opening 49 may also be replaced by another ring-shaped elastic element, such as one in the form of an O-ring or a ring rectangular in cross-section, or the like.

As is shown by the illustration, the possibility also exists of introducing into the interior of the housing a stop element 70 in the form of a bushing. This stop element 70 prevents the seal 17 from sliding into the groove 33 should the separating piston 13 return to a much higher position (not shown). The external circumference of the respective stop element 70 rests flush against the interior circumference of the piston housing 1, and extends in an axial direction between the end wall 5 and one free end of the separating piston 13 when, as shown in the figure, this piston comes to rest against the stop element 70. The stop element 70 is fixed by its inherent tension inside the piston housing 1 in its position as illustrated. The stop element may also be replaced by a projection or other stop means on the inside of the piston housing 1. The configuration of the stop is selected such that the sealing means 17 cannot reach the groove 33 when the device is in operation.

While one embodiment has been chosen to illustrate the invention, it will be understood by those skilled in the art that various changes and modifications can be made therein without departing from the scope of the invention as defined in the appended claims.

What is claimed is:

1. A piston accumulator, comprising:

a housing having a fluid side, a gas side and a cylindrical tube with a longitudinal axis and an inner wall surface;

a separating piston axially displaceable within said housing and separating said gas side from said fluid side;

first and second sealing areas axially offset from one another on a lateral peripheral side of said piston and engaging said inner wall surface;

a vent opening extending through said housing between said sealing areas of said piston for discharging leakage media penetrating said sealing areas;

a collecting chamber in fluid communication with said vent opening and receiving the leakage media from said vent opening, said collecting chamber including an annular element seated outside of said piston and receiving said cylindrical tube, said annular element including an annular member extending equidistant from an outside surface of said cylindrical tube, and end strips projecting radially inward from said annular member to said cylindrical tube to space said annular member from said cylindrical tube and define a clear width of said collecting chamber;

an outlet opening extending through said annular member between said end strips; and an elastic band circumferentially surrounding said annular member and releasably covering said outlet opening to control flow of leakage media from said collecting chamber and through said outlet opening;

whereby said elastic band opens said outlet opening by prevailing pressure of leakage media in said collecting chamber.

2. A piston accumulator according to claim 1 wherein said edge strips have inside surfaces facing one another with seals engaging said outside surface of said cylindrical tube.

3. A piston accumulator according to claim 1 wherein said piston comprises a recess in said lateral peripheral side thereof and in an axial section thereof between said first and second sealing areas for fluid communication with said vent opening.

4. A piston accumulator according to claim 1 wherein said piston comprises a third sealing area axially offset form said first sealing area in the direction of said gas side by a distance greater than an axial spacing between said first and second sealing areas;

a supply device is provided in said piston to deliver free flowing lubricant to said lateral peripheral side of said piston between said second and third sealing areas.

5. A piston accumulator according to claim 1 wherein an inner end of said vent opening is in fluid communication with an annular groove in said inner wall surface of said housing opening in a direction perpendicular to said longitudinal axis.

6. A piston accumulator according to claim 1 wherein said elastic band is rectangular in transverse cross section.

7. A piston accumulator according to claim 6 wherein said cross section has a length parallel to said longitudinal axis substantially greater than a width thereof perpendicular to said longitudinal axis.

8. A piston accumulator according to claim 1 wherein said annular element rotationally adjustable about said cylindrical tube.

* * * * *